(12) United States Patent
Miyamoto

(10) Patent No.: US 7,632,551 B2
(45) Date of Patent: Dec. 15, 2009

(54) METHOD FOR PREPARING REACTIVE LAYERED MATERIAL IN GRAPHITE FORM

(75) Inventor: Yoshiyuki Miyamoto, Minato-ku (JP)

(73) Assignee: NEC Corporation, Tokyo (JP)

( * ) Notice: Subject to any disclaimer, the term of this patent is extended or adjusted under 35 U.S.C. 154(b) by 720 days.

(21) Appl. No.: 10/527,201

(22) PCT Filed: Aug. 21, 2003

(86) PCT No.: PCT/JP03/10593

§ 371 (c)(1),
(2), (4) Date: Mar. 10, 2005

(87) PCT Pub. No.: WO2004/024623

PCT Pub. Date: Mar. 25, 2004

(65) Prior Publication Data

US 2006/0049033 A1    Mar. 9, 2006

(30) Foreign Application Priority Data

Sep. 10, 2002    (JP)    ............... 2002-264137

(51) Int. Cl.
*H01J 37/30*    (2006.01)
(52) U.S. Cl. .............. 427/596; 977/742; 977/745; 977/847; 427/372.2
(58) Field of Classification Search ........... 427/596; 977/742, 745, 842, 847
See application file for complete search history.

(56) References Cited

U.S. PATENT DOCUMENTS 5,993,697 A * 11/1999 Cohen et al. ............. 252/502

FOREIGN PATENT DOCUMENTS

| JP | H06-184738 A | 7/1994 |
|---|---|---|
| JP | H07-172807 A | 7/1995 |
| JP | H10-139411 A | 5/1998 |
| JP | 2001-262343 A | 9/2001 |
| JP | 2001-270707 A | 10/2001 |

OTHER PUBLICATIONS

A. V. Krasheninnikov et al., "Production of Defects in Supported Carbon Nanotubes Under Ion Irradiation", Physical Review B, Apr. 2002, vol. 65, 165423.
F. Banhart et al.; "The Formation, Annealing and Self-Compression of Carbon Onions Under Electron Irradiation"; Chemical Physics Letters 269; May 2, 1997; pp. 349-355.
D. Golberg et al.; "Boron Nitride Nanotube Growth Defects and Their Annealing-Out Under Electron Irradiation"; Chemical Physics Letters 279; Nov. 14, 1997; pp. 191-196.

* cited by examiner

*Primary Examiner*—Michael Cleveland
*Assistant Examiner*—Alex Rolland
(74) *Attorney, Agent, or Firm*—Sughrue Mion, PLLC

(57) ABSTRACT

This invention provides a process for preparing a reactive graphite-like layered material with high chemical reactivity while maintaining stability of a base material. In the preparation process according to this invention, first, the treatment for reducing the number of dangling bonds in the vicinity of the vacancy to form an introducing site is conducted by binding atoms together with each other, which atoms are adjacent to a vacancy in a graphite-like layered material. Then, atoms 3 and 4 to be introduced, i.e., a diatomic molecule made of atoms constituting the graphite-like layered material are introduced into the introducing site formed in advance. Then, new bonds are generated between introduced atoms 3, 4 and the graphite-like layered material.

16 Claims, 4 Drawing Sheets

METHOD FOR PREPARING REACTIVE LAYERED MATERIAL IN GRAPHITE FORM

TECHNICAL FIELD

This invention relates to a process for preparing a reactive graphite-like layered material.

BACKGROUND ART

A graphite-like layered material such as a graphite and a boron nitride layers or a nanotube composed of the cylindrical structure thereof is low in chemical reactivity. As for an approach to invest graphite-like layered material with reactivity, conceived may be a technique of chemical modification with a reactive functional group thereto or a technique of intentional introduction of defects therein. Among those, as a method for intentionally introducing defects, such a method has proposed in which dangling bonds (unbonded hands) are formed by cleaving some of bonds between carbon atoms constituting a carbon nanotube (JP 07-172807 A).

This technique was effective as a method for hole opening in a carbon nanotube, initiation of branching or cutting-up therein. However, In the method, as large crater structures are formed thereby in the carbon nanotube, there is considerable possibility that the base material may be corroded or deteriorated from the dangling bonds formed therein, which makes it difficult to use the material for a long period.

DISCLOSURE OF THE INVENTION

In view of the above situation, an objective of this invention is to provide a process for preparing a reactive graphite-like layered material with high chemical reactivity while maintaining stability of a base material.

According to an aspect of this invention, there is provided a process for preparing a reactive graphite-like layered material comprising the steps of:

binding atoms having a dangling bond together with each other which are adjacent to a vacancy included in a graphite-like layered material, for reducing the number of dangling bonds in the vicinity of said vacancy to form an introducing site;

introducing a molecule or atom constituting the graphite-like layered material into the introducing site; and generating a new bond between the introduced molecule or atom and the graphite-like layered material.

In this invention, a reactive graphite-like layered material refers to a graphite-like layered material possessing chemical reactivity. A graphite-like layered material refers to a mono- or multi-layered material having a hexagonal main framework, such as graphite and h-BN (hexagonal boron nitride).

In the process for preparing a reactive graphite-like layered material according to this invention, an atom adjacent to a vacancy in a graphite-like layered material used as a base material have a dangling bond being energetically unstable. The preparation process according to this invention comprises the step of binding the dangling bonds together with each other, and thereby forming an introducing site for a new atom or molecule. The step is a step for affording structural relaxation to a base material.

The term "structural relaxation" as used herein refers to reducing an internal energy of a system, whereby the number of dangling bonds in the system is reduced. When relaxing the vicinity of a vacancy, it can provide a structure having a metastable binding state although it is less stable than a graphite-like honeycomb structure. The structure is an introducing site.

The process further comprises the steps of introducing an atom or molecule constituting a graphite-like layered material into the introducing site thus formed and then generating a new bond between the introduced molecule or atom and the graphite-like layered material. In the preparation process according to this invention, after an introducing site is formed in the vicinity of a vacancy in a base material, a new atom or molecule is introduced thereinto. Therefore, once the introduced atom or molecule is bound to the base material, a metastable structure is formed instead of recovering a graphite-like honeycomb structure. The metastable structure resulted is structurally relaxed to keep away from spontaneous vanishing. The preparation process according to this invention can, therefore, stably form a structure having high chemical reactivity without any use of chemical modifications with an element other than the components of the graphite-like layered material.

In the preparation process of this invention, the step of forming an introducing site or the step of generating a new bond therein may comprise the step of conducting the annealing or photoexciting treatment to the graphite-like layered material, which treatment allows an introducing site or new bond to be more effectively formed and to more effectively prevent the framework structure of the base material from being deteriorated.

According to another aspect of this invention, there is provided a process for preparing a reactive graphite-like layered material comprising the steps of:

forming a vacancy in a graphite-like layered material;

reducing the number of dangling bonds in the vicinity of said vacancy by binding atoms adjacent to said vacancy together with each other to form an introducing site;

introducing a molecule or atom constituting said graphite-like layered material into said introducing site; and generating a new bond between said introduced molecule or atom and said graphite-like layered material.

The preparation process according to this invention comprises the step of forming a vacancy in a base material having a graphite-like honeycomb structure, so that a chemically reactive structure can be effectively formed. The number of atoms per a vacancy can be controlled to prevent a base material from being deteriorated.

In the preparation process of this invention, said step of forming a vacancy may comprise the step of irradiating said graphite-like layered material with an electron beam. With use of such procedure, a vacancy can be formed further effectively therein.

In the preparation process of this invention, such constitution that an atomic vacancy number per a vacancy is one or two may be employed. When an atomic vacancy number is two, a resulted structure with chemical reactivity is accompanied by no dangling bonds, so that a reaction of a dangling bond with an impurity or the like or breakage of a chemical-bond network in a base material can be suppressed thereby. It, therefore, allows a reactive graphite-like layered material in which reduction in mechanical strength of the base material is inhibited to be stably prepared. Even when an atomic vacancy number is one, a structure with reactivity may be achieved with such structure with no dangling bond.

In the preparation process of this invention, the graphite-like layered material may include graphite, or alternatively it may comprise mainly nitrogen and boron atoms. Since these materials have a graphite-like honeycomb structure, they can be effectively activated by the preparation process according to this invention.

In the process for preparing a reactive graphite-like layered material of this invention, said graphite-like layered material may constitute a side wall of a nanotube. Thus, in such a case, a nanotube being inferior in chemical reactivity can be activated therewith, while breakage of a chemical-bond network of the base material can be repressed.

Figure 1:
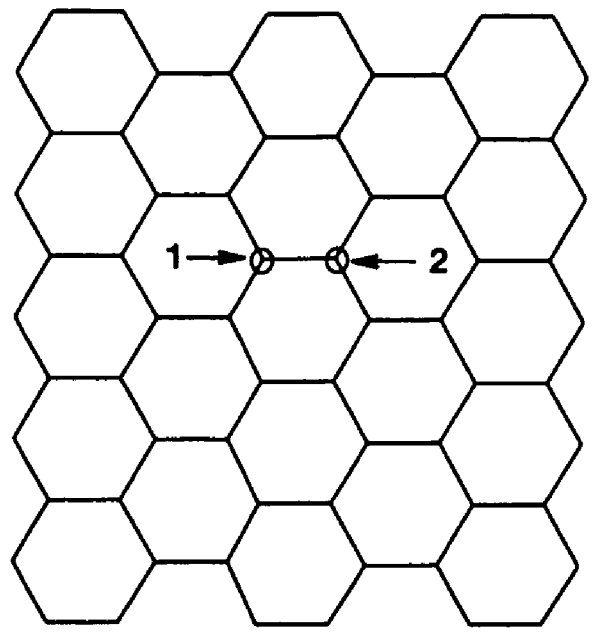
FIG. 1 is a view illustrating an embodiment of a process for preparing a reactive graphite-like layered material according to this invention, showing an example of the step of forming a vacancy.
Figure 4:
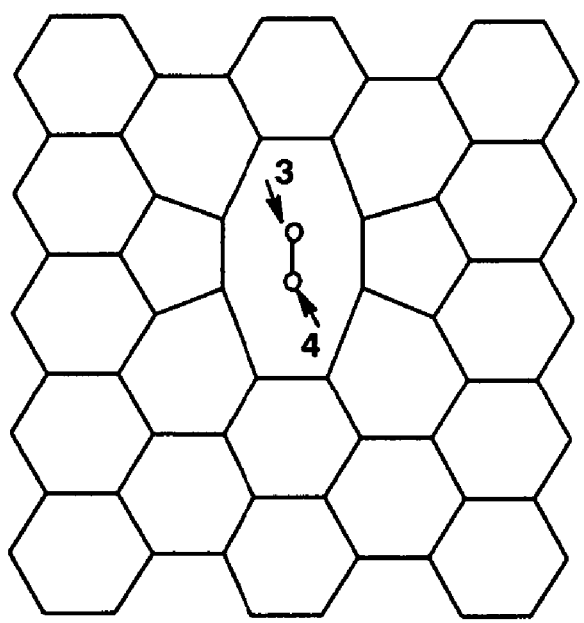
FIG. 4 is a view illustrating an embodiment of a process for preparing a reactive graphite-like layered material according to this invention, showing an example for the step of introduction of a molecule or atom constituting the graphite-like layered material into an introducing site.
Figure 7:
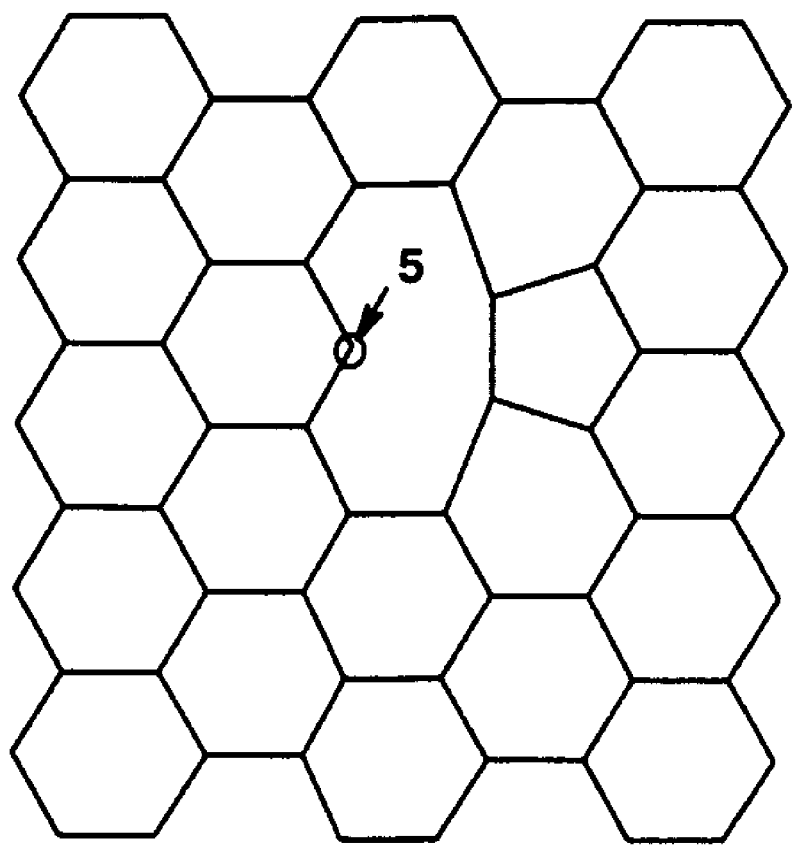
FIG. 7 is a view explaining another embodiment of a process for preparing a reactive graphite-like layered material according to this invention, showing an example of a structure exhibiting chemical reactivity formed in the layered material.

The symbols in FIGS. 1, 4 and 7 have the following meanings; 1: a detached atom, 2: a detached atom, 3: an introduced atom, 4: an introduced atom, and 5: a detached atom.

BEST MODE FOR CARRYING OUT THE INVENTION

There will be explained preferred embodiments of this invention hereafter.

FIG. 1 illustrates a honeycomb structure of a graphite-like layered material used as a base material. A material having a hexagonal layered structure such as graphite and h-BN (hexagonal boron nitride) may be employed as the base material therefor. The base material may possess mono- or multi-layered structure, and it may be a compound shaped in a sheet form or a compound shaped in cylinder form. For instance, as for a layered compound, HOPG (highly oriented layered graphite) may be used. As for a compound in cylindrical form, for example, a compound having a nanotube structure may be used as a base material. Alternatively, hexagonal $BC_2N$ may be also used.

In a graphite-like layered material having a framework structure shown in FIG. 1, a vacancy is formed. During the step, an atomic vacancy number per a vacancy is to be controlled. As the larger a vacancy size is, the more easily the base material is deteriorated. For example, an atomic vacancy number per a vacancy may be within 6. Furthermore, an atomic vacancy number per a vacancy may be preferably limited to 2 or less. Thus, as described below, graphite-like layered material can be effectively invested with chemical reactivity while preventing the structure of the base material from being deteriorated. There will be described a process for preparing a reactive graphite-like layered material according to this preferable embodiment, by way of an example where an atomic vacancy number per a vacancy is one or two.

Figure 2:
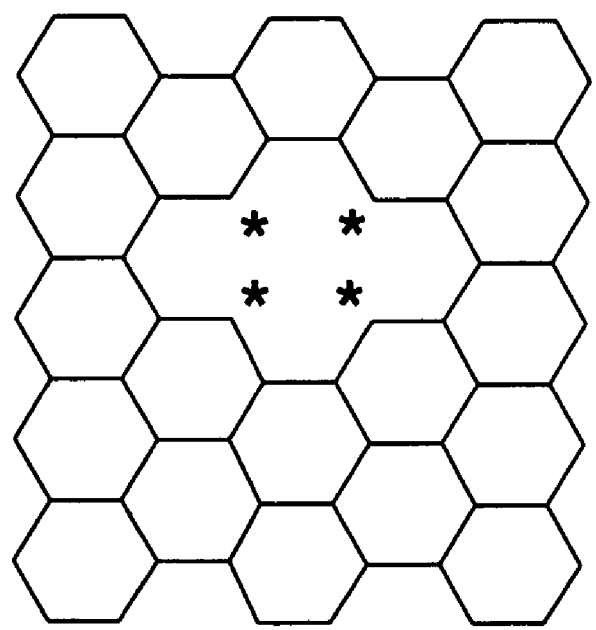
FIG. 2 is a view illustrating an embodiment of a process for preparing a reactive graphite-like layered material according to this invention, showing an example of a vacancy formed in the layered material.

In the structure shown in FIG. 1, when adjacent two atoms such as detached atoms 1 and 2 are eliminated, the structure shown in FIG. 2 is obtained therefrom. The structure shown in FIG. 2 has a vacancy where elimination of two adjacent atoms are detached away. In the case where the base material is a graphite material, two adjacent carbon atoms are detached, while in the case where it is a h-BN material, adjacent one nitrogen and one boron atoms are detached.

Electron beam irradiation may be used as means for forming a vacancy in a graphite-like layered material. Thus, with use of such technique, an atomic vacancy number per a vacancy can be effectively controlled. As a method of electron beam irradiation, such methods, for example, disclosed in JP 10-139411 A or in Hidefumi Hiura, J. Materials Research Vol. 16, p. 1287 (2001) can be employed.

A method for irradiation with ions of inert gas having a comparable weight to a weight of two atoms of base-material (e.g., He, Ne or Ar gases) may be employed as an alternative method for forming a vacancy in a graphite-like layered material used as a base material Next, the step for structural relaxation is effected for the vacancy formed in the base material. It is because there are numbers of dangling bonds on atoms in the vicinity of the vacancy, which makes the vacancy energetically unstable. When structural relaxation being conducted, atoms in the vicinity of the vacancy are bound together with each other to reduce the number of dangling bonds, and also to suppress destruction of the sample such as vacancy expansion.

For instance, such a technique as thermal annealing may be used as a method for conducting structural relaxation. Annealing may be effected by, for example, treating at a temperature of 1000 K or higher for 10 min to 5 hours. In place of annealing, local photoexcitation may be applied to induce atomic motion therein. In the case of photoexcitation, it may be conducted by treatment at room temperature, for instance, for duration of from $10^{-14}$ sec to $10^{-12}$ sec.

Figure 3:
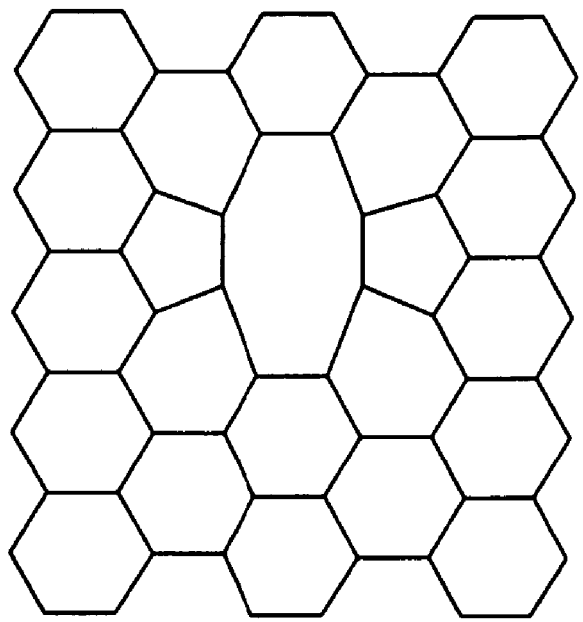
FIG. 3 is a view illustrating an embodiment of a process for preparing a reactive graphite-like layered material according to this invention, showing an example of an introducing site formed in the layered material.

Thus, an introducing site shown in FIG. 3 can be obtained. The extent of reduction in the number of dangling bonds in the base material can be evaluated, for example, based on results of analysis of an infrared spectrum, observation by means of STM (scanning tunneling microscopy) or measurement of variation in a vibration frequency of atomic nuclear therein.

Then, a molecule or atom of the base material component is introduced into the introducing site resulted. In FIG. 4, example is illustrated in which a diatomic molecule composed of introduced atoms 3 and 4 is introduced thereinto. For example, in the case when the base material is a graphite-based material, a $C_2$ molecule is fed thereinto. If the molecule is fed at the stage that atoms adjacent to the vacancy have not been bound together with each other as shown in FIG. 2, the structure is returned to that shown in FIG. 1. In contrast, a $C_2$ molecule is fed after atoms adjacent to the vacancy are bound together with each other in this embodiment, and thus the energetically stable structure as shown in FIG. 4 will be attained. Typically, introduced atoms 3 and 4 are introduced such that the bond axis of the $C_2$ molecule is aligned parallel to the major axis of the introducing site. The introduced $C_2$ molecule may be obtained by decomposing a hydrocarbon molecule such as ethylene and acetylene by means of a plasma or the like. For Instance, a method described in JP. 2001-262343 A may be employed. In the case when the base material is a BN-based material, for example, employed may be such technique that a mixed gas of nitrogen and $HfB_2$ is excited by a plasma to generate a BN molecule, which is then introduced into the introducing site of the base material.

As shown in FIG. 4, after introducing the diatomic molecule composed of introduced atoms 3 and 4, the step of structural relaxation is again effectured. As described above, such method as annealing at 1000 K or higher or photoexcitation may be employed. Thus, a new bond can be generated between the introduced molecule or atom and the base material thereby.

Figure 5:
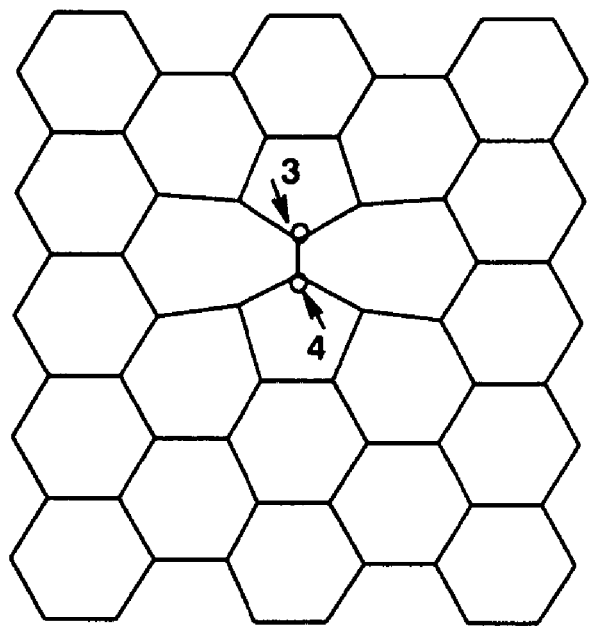
FIG. 5 is a view illustrating an embodiment of a process for preparing a reactive graphite-like layered material according to this invention, showing an example of a structure with chemical reactivity formed in the layered material.

The structure thus obtained is just the structure presented in FIG. 5. The structure shown in FIG. 5 comprises two five-membered rings and two seven-membered rings. The two seven-membered rings comprise a single bond connecting the apices of the five-membered rings and two single bonds each linking between an apex and an atom adjacent to the apex, and whereby the bond axis between introduced atoms 3 and 4 is rearranged to be in a direction rotated by 90° to the bond axis between detached atoms 1 and 2. The structure as shown in FIG. 5 is a metastable Stone-Wales type structure. For example, when in a BN material there exists the Stone-Wales type structure presented in FIG. 5, chemical bonds between boron atoms and between nitrogen atoms are formed. Thus, these π-electron orbitals attributed to the bond between the same element atoms generate levels in a bandgap of boron nitride, which will endow the base material with chemical reactivity. Formation of the structure shown in FIG. 5 within the base material may be validated by measurement of the amount of new atoms or molecules introduced into the introducing site or observation of infrared absorption by means of FT-IR (Fourier transform infrared spectroscopy), Raman spectrometry or the like.

As an activation energy necessary to convert the Stone-Wales type defect presented in FIG. 5 into the structure shown in FIG. 1 is several eV, there occurs no spontaneous vanishing thereof, so that it is a stable structure. Furthermore, as there are no dangling bonds accompanying with the structure, breakage of a chemical bond in the base material itself or associated deterioration in the material is hard to be initiated when the chemical reaction therein occurs, which leads to a longer life.

Figure 6:
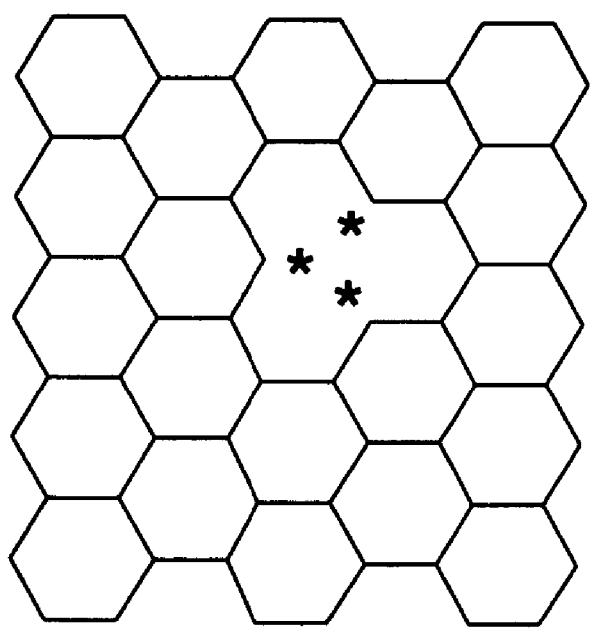
FIG. 6 is a view explaining another embodiment of a process for preparing a reactive graphite-like layered material according to this invention, showing another example for the step of forming a vacancy.

A vacancy formed when irradiating the base material having the structure as shown in FIG. 1 with an electron beam may be not only a diatomic vacancy illustrated in FIG. 2, but also a monoatomic vacancy shown in FIG. 6. For example, when using a BN compound as a base material, as the B atom tends to be energetically detached with more ease than another, formed therefrom is not only the structure illustrated in FIG. 2 but also that shown in FIG. 6. In such a case, the structure illustrated in FIG. 7 is formed by annealing, photo-irradiation or the like. Since detached atom 5 has a dangling bond in FIG. 7, electron beam irradiation is again conducted to remove the detached atom 5. After removal of detached atom 5, the step for structural relaxation with such as annealing is again effected to give the structure shown in FIG. 3. Thus, in the subsequent process similar to the case having a diatomic vacancy, a Stone-Wales type defect with chemical reactivity (FIG. 5) can be formed.

Thus, in this embodiment, even when vacancies obtained by irradiating a graphite-like layered material as a base material with an electron beam are a mixture of diatomic and monoatomic vacancies, the above steps can be repeatedly applied to invest them with chemical reactivity.

As aforementioned with referring to FIGS. 1 to 5, a process for preparing a reactive graphite-like layered material according to this embodiment comprises the steps of:

forming a eight-membered ring in a graphite-like layered material;

introducing two atoms or a diatomic molecule into the eight-membered ring; and forming two seven-membered rings and two five-membered rings from the eight-membered ring, a pair of five-membered rings each of which shares one of two parallel single bonds of the eight-membered ring parallel to its main axis with the eight-membered ring, and the two atoms or the diatomic molecule. In addition, when a monoatomic vacancy is formed, the process further comprises the step of forming a nine-membered ring in a graphite-like layered material.

Furthermore, the technical field to which a reactive graphite-like layered material prepared according to this embodiment can be applied is not limited to any specific targets. For example, utilizing its higher reactivity, it may be effectively used as an adsorbent or carrier for catalyst.

EXAMPLES

Embodiment 1

In embodiment 1, graphite is used as a base material. The base material has a honeycomb skeletal structure as shown in FIG. 1.

At first, a graphite having a framework structure shown in FIG. 1 is irradiated with an electron beam. For example, when irradiating the base material with a 4 keV electron beam under a reduced pressure at about $10^{-5}$ Pa, a current is chosen within range of 10 mA to 40 mA for a sample with a size of 5 mm×5 mm×2 mm, and an irradiation time is limited to 1 min or less. Thus, detached atoms 1 and 2, i.e., two adjacent carbon atoms, are eliminated to form a diatomic vacancy shown in FIG. 2 in the base material.

Next, the base material in which the vacancy is formed is annealed. For example, annealing is conducted under such a condition of at 1000 K for 30 min. Thus, carbon atoms in the vicinity of the vacancy are bound together with each other thereby to obtain the eight-membered ring shown in FIG. 3, which becomes an introducing site.

Then, into the introducing site shown in FIG. 3 is introduced a diatomic molecule composed of introduced atoms 3 and 4, i.e., a $C_2$ molecule, and whereby the structure of FIG. 4 is produced in the base material. The $C_2$ molecule is generated by plasma decomposition of ethylene or acetylene gas and then contacted with the base material for introduction.

Sequentially, the base material into which the $C_2$ molecule has been introduced is again annealed. For example, annealing is conducted under such a condition of at 1000 K for 30 min, and whereby a Stone-Wales type defect shown in FIG. 5 is produced in the base material.

The reactive graphite thus obtained has the structure shown in FIG. 5 in its skeleton, so that it possesses chemical reactivity while maintaining its mechanical strength.

The fact that a Stone-Wales type defect with the structure shown in FIG. 5 which is formed in graphite has chemical reactivity may be confirmed from the evidence that chemical bond strength for atoms in the vicinity of the Stone-Wales type defect is higher than those for other atoms, as described in Sara Letardi, Massimo Celino, Fabrizio Cleri, Vittorio Rosato, Surface Science Vol. 496, p. 33 (2002).

Embodiment 2

In embodiment 2, h-BN is used as a base material. In embodiment 2, the base material also has the honeycomb skeletal structure shown in FIG. 1.

At first, in similar manner to that of embodiment 1, the base material is irradiated with an electron beam. Thus, one boron atom and one nitrogen atom neighboring to each other are detached to give a vacancy as shown in FIG. 2. Next, by the similar way to embodiment 1, annealing is carried out to form an introducing site shown in FIG. 3. After that, a gas mixture of nitrogen and $HfB_2$ is excited by a plasma to generate a BN molecule, which is then contacted with the base material for introduction into the introducing site. The structure as shown in FIG. 4 thus obtained is again annealed to form a Stone-Wales type defect shown in FIG. 5.

Similarly, in embodiment 2, the reactive h-BN obtained possesses chemical reactivity while maintaining its mechanical strength.

INDUSTRIAL APPLICABILITY

As explained above, according to this invention, a process for consistently preparing a reactive graphite-like layered material with high chemical reactivity while maintaining stability of a base material can be effectuated by employing a process comprising a series of the steps of binding atoms having a dangling bond together with each other which are adjacent to a vacancy included in a graphite-like layered material, for reducing the number of dangling bonds in the vicinity of the vacancy to form an introducing site; introducing a molecule or atom constituting the graphite-like layered material into the introducing site; and generating a new bond between the introduced molecule or atom and the graphite-like layered material.

The invention claimed is:

1. A process for preparing a reactive graphite-like layered material, which is a mono- or multi-layered material having a hexagonal main framework with chemical reactivity, from a graphite-like layered material referring to a mono- or multi-layered material having a hexagonal main framework comprising the steps of:
   binding atoms having a dangling bond together with each other which are adjacent to a vacancy included in said graphite-like layered material, for reducing the number of dangling bonds in the vicinity of said vacancy to form an introducing site;
   introducing a molecule or atom constituting the graphite-like layered material into the introducing site; and
   generating a new bond between the introduced molecule or atom and the graphite-like layered material,
   wherein the vacancy included in said graphite-like layered material is formed in the shape of a diatomic vacancy or a monoatomic vacancy by detaching two adjacent atoms or one atom away from the graphite-like layered material, and
   wherein the molecule or atom to be introduced into the introducing site is generated by decomposition of ethylene or acetylene or plasma excitation of a mixed gas of nitrogen and $HfB_2$, and the molecule or atom to be introduced into the introducing site is contacted with the graphite-like layered material for introduction.

2. The process claimed in claim 1, wherein said step of forming an introducing site or said step of generating a new bond comprises the step of conducting annealing or photoexciting treatment to the graphite-like layered material.

3. The process claimed in claim 1, wherein said graphite-like layered material includes graphite.

4. The process claimed in claim 1, wherein said graphite-like layered material comprises mainly nitrogen and boron atoms.

5. The process claimed in claim 1, wherein said graphite-like layered material constitutes a side wall of a nanotube.

6. The process claimed in claim 1, wherein said vacancy is formed in advance by means of irradiating said graphite-like layered material with an electron beam.

7. The process claimed in claim 1, wherein the introducing site is formed in the shape of an eight-membered ring from the vacancy formed in the shape of a diatomic vacancy.

8. The process claimed in claim 1, wherein the introducing site is formed in the shape of a nine-membered ring from the vacancy formed in the shape of a monoatomic vacancy.

9. A process for preparing a reactive graphite-like layered material, which is a mono- or multi-layered material having a hexagonal main framework with chemical reactivity, from a graphite-like layered material referring to a mono- or multi-layered material having a hexagonal main framework comprising the steps of:
   forming a vacancy in said graphite-like layered material;
   reducing the number of dangling bonds in the vicinity of said vacancy by binding atoms adjacent to said vacancy together with each other to form an introducing site;
   introducing a molecule or atom constituting said graphite-like layered material into the introducing site; and
   generating a new bond between said introduced molecule or atom and the graphite-like layered material,
   wherein the vacancy included in said graphite-like layered material is formed in the shape of a diatomic vacancy or a monoatomic vacancy by detaching two adjacent atoms or one atom away from the graphite-like layered material, and
   wherein the molecule or atom to be introduced into the introducing site is generated by decomposition of ethylene or acetylene or plasma excitation of a mixed gas of nitrogen and $HfB_2$, and the molecule or atom to be introduced into the introducing site is contacted with the graphite-like layered material for introduction.

10. The process claimed in claim 9, wherein the step of forming said vacancy comprises the step of irradiating said graphite-like layered material with an electron beam.

11. The process claimed in claim 9, wherein said step of forming an introducing site or said step of generating a new bond comprises the step of conducting annealing or photoexciting treatment to the graphite-like layered material.

12. The process claimed in claim 9, wherein said graphite-like layered material includes graphite.

13. The process claimed in claim 9, wherein said graphite-like layered material comprises mainly nitrogen and boron atoms.

14. The process claimed in claim 9, wherein said graphite-like layered material constitutes a side wall of a nanotube.

15. The process claimed in claim 9, wherein the introducing site is formed in the shape of an eight-membered ring from the vacancy formed in the shape of a diatomic vacancy.

16. The process claimed in claim 9, wherein the introducing site is formed in the shape of a nine-membered ring from the vacancy formed in the shape of a mono atomic vacancy.

* * * * *